Aug. 30, 1949.  P. F. MORGAN  2,480,665
DIFFUSION TUBE TESTING APPARATUS
Filed Feb. 5, 1945  3 Sheets-Sheet 2
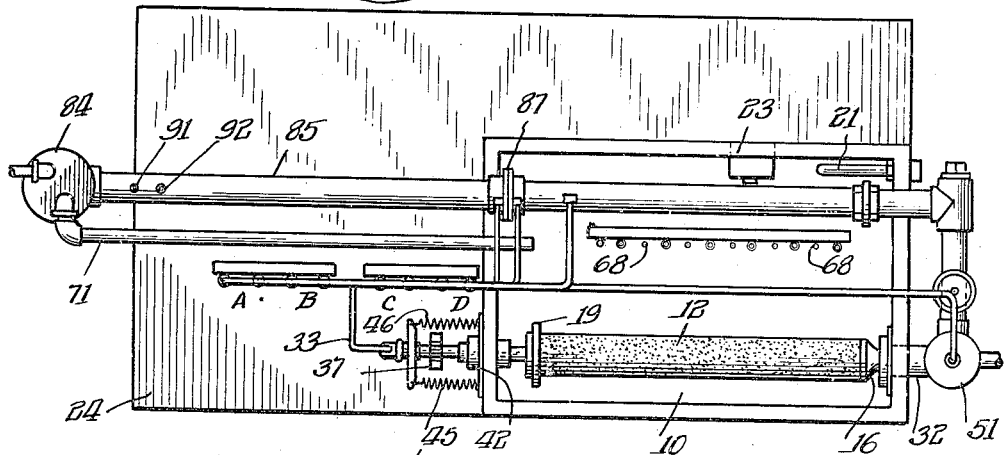
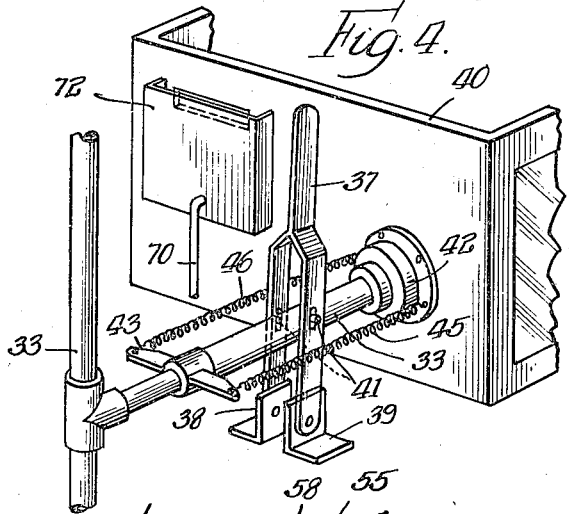
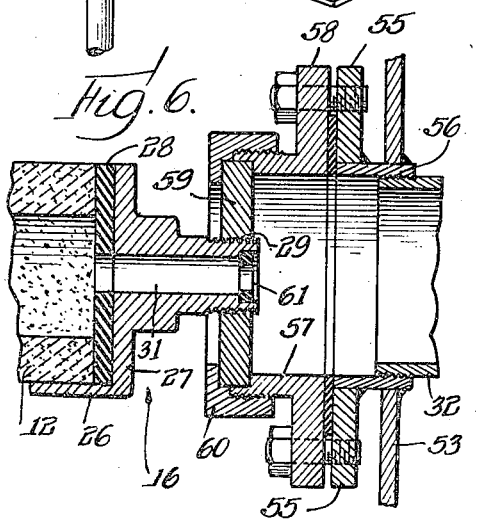
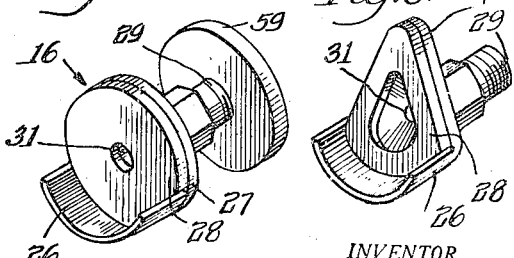
INVENTOR.
Philip F. Morgan
BY
Schneider & Dressler
attys.

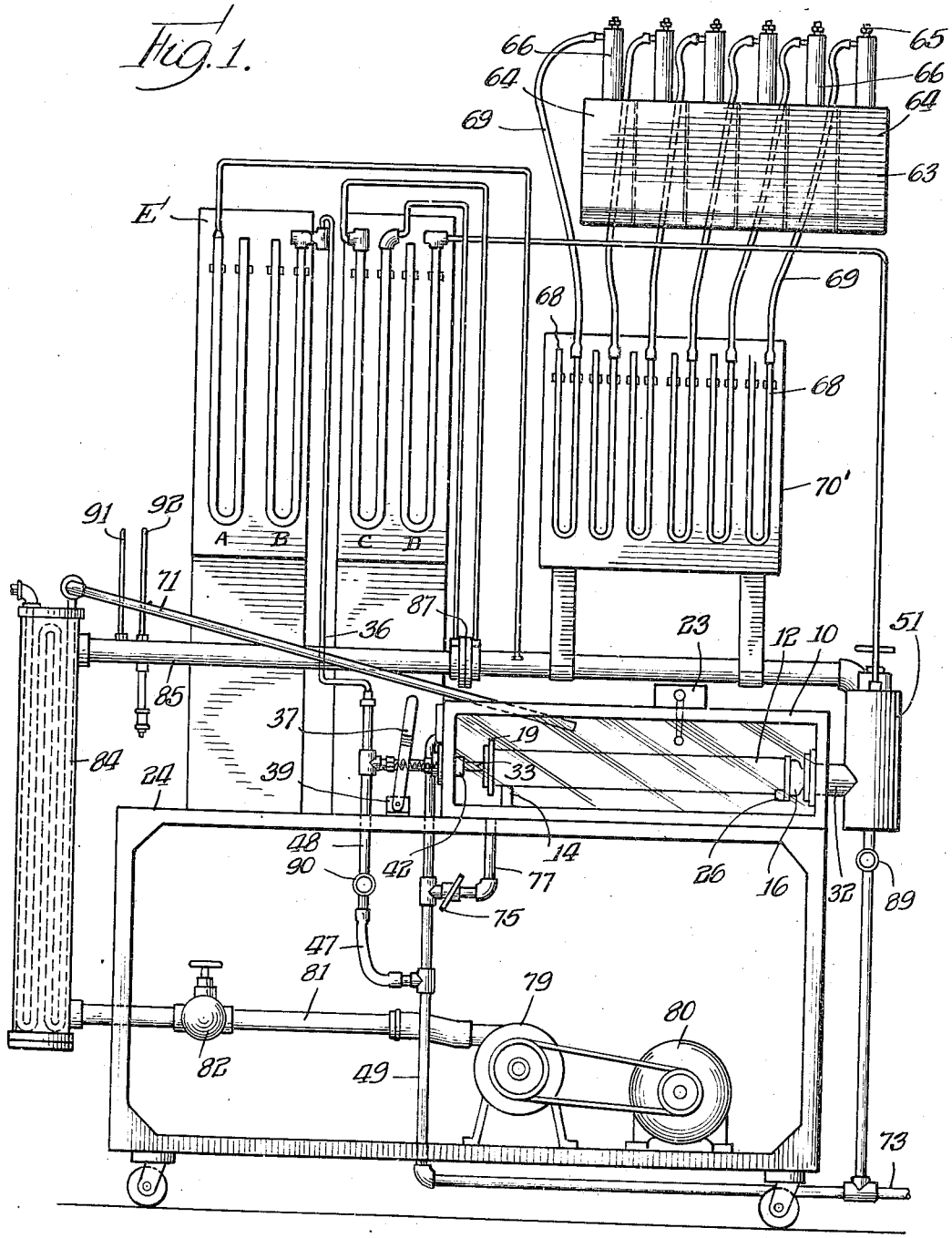

Aug. 30, 1949.  P. F. MORGAN  2,480,665
DIFFUSION TUBE TESTING APPARATUS
Filed Feb. 5, 1945  3 Sheets-Sheet 3
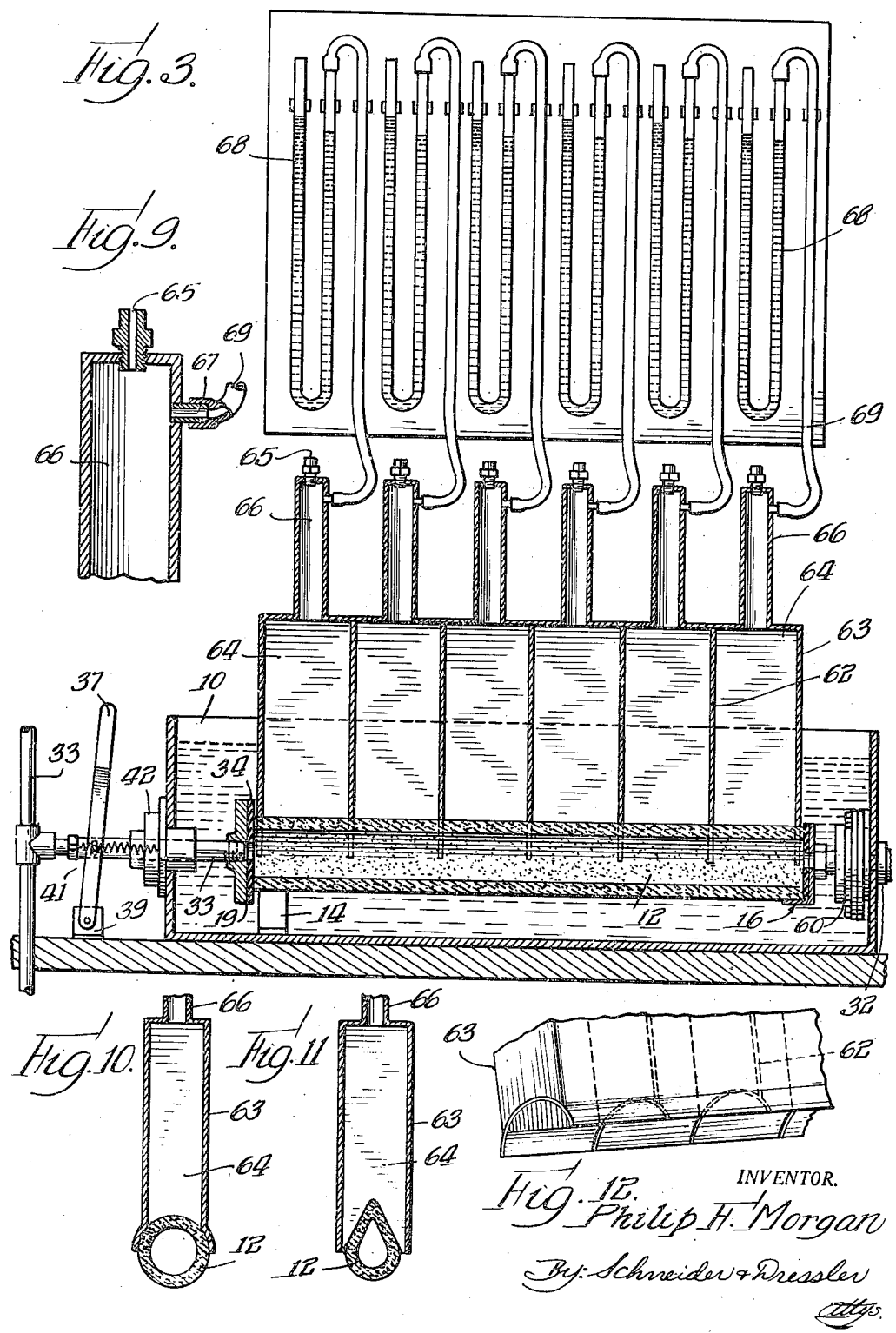
INVENTOR.
Philip F. Morgan
By: Schneider & Dressler
Attys.

Patented Aug. 30, 1949

2,480,665

UNITED STATES PATENT OFFICE 2,480,665

DIFFUSION TUBE TESTING APPARATUS

Philip F. Morgan, Elmhurst, Ill., assignor to Chicago Pump Company, a corporation of Delaware Application February 5, 1945, Serial No. 576,232

8 Claims. (Cl. 73—38)

This invention relates to a method of measuring the uniformity of distribution of an aeriform body through a porous diffuser element, and to an apparatus for carrying out this method. More particularly it relates to the measurement of the uniformity of distribution of air through a diffuser tube or plate of the type used in a sewage treating system.

In the treatment of sewage by the conventional activated sludge treating process, for example, it is important to obtain uniformity of distribution of air through the diffuser elements and into the surrounding liquid to insure maximum efficiency of operation of the system. By way of example, the invention will be described in connection with diffuser elements in the form of tubes used in such a system.

Diffuser tubes are made of carbon or fused alumina, for example, and are chemically inactive in the general conditions met in the treatment of sewage. Up to the present time no simple method has been used for measuring the uniformity of distribution of air through such tubes, insofar as I am aware.

It has been found that when air is being discharged through a diffuser tube at a non-uniform rate throughout its length, there are points of excess discharge which cause the air bubbles to coalesce. In consequence, the air is not uniformly dispersed throughout the liquid surrounding the tube and the system doesn't operate at a maximum efficiency. While a diffuser tube may discharge air uniformly throughout the length thereof, the air bubbles may nevertheless coalesce unless the rate of discharge of air through the tube is maintained at or below the maximum allowable rate for the tube. The maximum allowable rate is the highest rate at which the tube can be operated before coalescence commences. The coalescence that may appear prevents the diffusion of the fine bubbles into the surrounding liquid.

The prime requisites of a good diffuser tube are, therefore, uniformity of distribution over the entire operative section thereof and a media which will produce fine bubbles when discharging air at the design or normal rate of discharge into a liquid. To insure that the system will operate at a maximum efficiency, each tube should be measured to determine its uniformity of air distribution therethrough before use. The method and apparatus of the present invention were developed for that purpose.

The apparatus for carrying out the method of my invention is rather simple and comprises a tank containing water or other liquid in which the tube to be tested is removably positioned. One end of the tube is placed in communication with a source of air and the other end with a piezometer which measures the air pressure within the tube. A distribution hood, divided into compartments of uniform size and shape, is positioned over the tube so that equal sections of the tube will discharge air into the various compartments. Differential manometers and connections therefrom to each compartment of the distribution hood are provided for indicating the flow of air through each section of the tube and into its associated compartment, thereby showing at a glance the rate of discharge of air through each section of the tube.

In the operation of the apparatus herein described air is passed under pressure to a tube immersed in a body of liquid and the air passes through pores in the tube in a finely dispersed state. The air then bubbles up through the body of liquid into the compartments. Each compartment vents air to the atmosphere through a measuring orifice and the differential pressure is transferred to the respective differential manometers connected to each compartment, thus indicating at a glance the pressure on the measuring orifice and the uniformity of distribution of air through each section of the tube. It is manifest that with the apparatus and method of my invention the uniformity of distribution of air through the tube can be readily observed.

The invention will be fully understood by the following detailed description of a preferred form of apparatus in accordance with the invention, taken in conjunction with the drawings accompanying this specification, wherein:

Figure 1 shows a front elevation of the tube testing device of my invention, showing the distribution hood in inoperative position;

Fig. 2 is a plan view of the apparatus shown in Fig. 1, the distributing hood and its connections not being shown.

Fig. 3 is a longitudinal sectional view of a portion of the apparatus shown in Fig. 1, with parts in elevation, showing the hood in operative position;

Fig. 4 is an external perspective end view of the tank of my apparatus, showing the piezometer line with the lever and spring for operating the tube holding mechanism;

Fig. 5 is an internal perspective view of the same end of the tank;

Fig. 6 is a fragmental sectional view showing details of the air inlet fitting and the tube adapter.

Fig. 7 is a perspective view of a tube adapter and adapter plate for a round tube;

Fig. 8 is a perspective view of a tube adapter and adapter plate for a streamlined tube of "teardrop" shape;

Fig. 9 is a fragmentary section of a discharge tube from one of the compartments of the hood;

Fig. 10 is a vertical section through a portion of the hood of Fig. 3 which is mounted on a cylindrical tube;

Fig. 11 is a similar view of a modified form of hood which is adapted for mounting on a "teardrop" tube, as shown; and Fig. 12 is a fragmentary perspective view of the bottom of the cylindrical tube hood of Figs. 3 and 10.

The tube testing device of the present invention comprises a tank 10, for receiving water or other liquid, in which a diffuser tube 12 to be tested is removably positioned below the level of the liquid. The tank may be of rectangular or other shape and, preferably (as shown), has side walls of glass or other transparent material to enable the operator to see what is taking place within the tank. A tube rack 14 is secured to the bottom of tank 10 in a position between a tube adapter 16 and an end plate 18, and provides, with the adapter, a cradle for supporting the tube. Positioned slightly above the bottom of tank 10 and below the normal level of the liquid in the tank is an immersion heater 21 which serves to maintain the liquid at any desired temperature. A thermostat 23 is provided to regulate the heater to maintain a constant temperature throughout the test. The entire tube testing apparatus, as shown in Fig. 1, is bolted or otherwise secured upon a portable table 24, so that the mechanism can be readily moved from place to place for use where desired.

Tube adapter 16, as shown in Figs. 7 and 8, comprises a metal backing member 27 having a forwardly projecting skirt or cradle member 26 for supporting one end of the tube. Member 26 is shaped to conform to the contour of the tube. The one shown in Fig. 7 is shaped to conform to the contour of the cylindrical tube and the one shown in Fig. 8 is shaped to conform to the contour of the "teardrop" tube. Backing member 27 is provided with a front cushioning facing layer 28 of sponge rubber or other suitable resilient material against which one end of frangible diffusion tube 12 is positioned during testing of the tube. A threaded connection 29 is formed on the back of member 27 for connecting adapter 16 to a plate adapter 59. An opening 31 is provided through cushion 28 and adapter 16 so that air from air line 32 can pass to and through tube 12. Cushion 28 acts as a gasket to simultaneously prevent the escape of air passing into the tube and the ingress of water into the tube during testing, and at the same time prevents the tube from being injured by the pressure exerted upon it by the backing member. The tube adapters shown in Figs. 7 and 8 are of the same general construction and differ merely in shape to conform to the shape of the tubes to be tested. As indicated above, the adapter of Fig. 7 is designed for use with a cylindrical tube and that of Fig. 8 for a "teardrop" tube.

End plate 18 as shown on Fig. 5, includes a metal backing member 19 and a cushioning layer 34 of a material similar to that of cushion 28. Cushion 34 is attached to the front of backing member 19 and its function is similar to that of cushion 28. At the center of end plate 18 and cushion 34 is a small opening 35 which allows some air to pass from the tube and through a piezometer line 33 which is connected to end plate 18 and extends rearwardly therefrom through an end wall 40 of the tank. Piezometer line 33 is, in turn, connected to manometer E, through a T and nipple connection, by a flexible tube 36.

Tube 12 is held in the operative testing position by a tube locking mechanism. This mechanism comprises a hand operated lever 37 having a bifurcation providing legs which straddle line 33. These legs are pivoted at the bottom to lugs 38 and 39 which are secured to the top of the portable table 24. Each of the lever legs is provided with an opening into which lugs 41, attached to piezometer line 33, are inserted, thereby securing the lever to line 33. Surrounding the piezometer line at the tank wall 40 is a packing box 42 which extends through the wall 40 of the tank and serves to prevent water from leaking through the walls of the tank when the piezometer line 33, and with it end plate 18, are moved forward and backward by the corresponding movement of lever 37. The backward movement of lever 37 is against the action of springs 45 and 46 which tend to hold plate 18 tightly against the end of the tube, as follows. A spring clamp 43 is secured to line 33 at a distance from end wall 40 beyond the length of the springs 45 and 46 in their normal unextended position. One end of each of the springs is secured to clamp 43, the springs are then extended, and the other ends are secured to packing box 42 or, if desired, to the wall 40. It is thus apparent that springs 45 and 46 exert a constant pull on clamp 43 toward wall 40, and, in turn, on line 33 and end plate 18, forcing the latter against the end of the tube. When lever 37 is pulled away from the tank, piezometer line 33 is moved in the same direction and carries end plate 18 towards the inner side of wall 40. With the lever in this position it is possible to insert the tube into its proper position for testing. When lever 37 is released the tension on the springs 45 and 46 urges line 33 and end plate 18 back to the normal operating position and cushion 34 is pressed against the tube and holds it in place. To allow for movement of piezometer line 33, there is provided a flexible conduit 47 between a pipe 48 connected to the T fitting at the end of the piezometer line and a drain pipe 49.

In Fig. 6 the air inlet fittings and adapter are shown. The air passes from air main 51 to air inlet pipe 32 through an opening in tank wall 53. An internally threaded half nipple 56 is positioned within the opening in tank wall 53 and is welded to the wall. The forward end of this nipple extends into the tank and the rear end terminates slightly beyond the tank wall. Inlet pipe 32 is threaded into the rear end of the nipple. An annular flange 55 is welded to the exterior of nipple 56, at the forward end thereof. A short cylindrical sleeve or collar 57, provided at one end with an annular flange 58, is secured to flange 55. The plate adapter 59 is fitted into a recess formed internally in the forward or opposite end of collar 57 and is held in position by the internally threaded plate lock 60, the collar 57 being externally threaded to receive the same. Plate adapter 59 is provided with an internally threaded opening into which the threaded end 29 of tube adapter 16 is screwed. An orifice 61 is secured in a recess formed at the extremity of fitting 29 to simulate actual operating conditions. It is manifest from the foregoing and from Fig. 6 that there is a direct line of flow of air from inlet 32 into the tube to be tested.

The air supplied to the device passes through the porous body of the diffuser tube. The air within the tube is in communication through opening 35 and piezometer line 33, with a manometer or other pressure indicating device, as hereinafter set forth. The external surface of the tube is divided into equal sections by means of an air distribution hood 63 so that the distribution of air through each section may be determined, thereby providing a means for determining the uniformity of distribution of air throughout the length of the tube.

Hood 63 is in the form of an open bottom tank, of a length and width commensurate with the length and diameter of the diffuser tube. In use for the purpose described, the open bottom is positioned to receive the air passing through the tube. The hood is divided into compartments of equal size and shape by means of partitions 62 which extend between the side walls of the hood from the closed top to the open bottom thereof. The hood may be divided into as many compartments as desired and the more there are, within practical limits, the more accurate is the testing. The end walls of the hood and the free ends of the partitions are cut to conform to the shape of the tube so that the hood may be positioned directly on the tube and in snug contact therewith (Figs. 3, 9 and 10), to divide the tube into sections and to insure that the air from each section will flow only into its corresponding compartment. Where the tube is of cylindrical form the cutouts at the free ends of the partitions and end walls of the hood are such as to provide the arcuate bottom for straddling the tube, as shown in Figs. 10 and 12. For a "teardrop" tube, the free ends of the partitions and end walls have the inverted V-shape shown in Fig. 11. Obviously, the shape of these cutouts may have other forms, depending upon the shape of the tube to be tested.

Each compartment of the hood is provided with an air discharge tube 66 which rises upwardly from the closed top of the hood. An orifice device 65 of conventional form and having an orifice of predetermined size, or other suitable air metering device, is secured to the top of each discharge tube to provide a vent to the atmosphere and thereby establish air pressure differentials in each compartment which may be readily indicated on manometers 68 which are individually connected to a single compartment by connections 67 in the discharge tubes 66 and the rubber hoses 69, or other suitable conduits. These manometers are of the conventional water type, but other types may, of course, be used. It is apparent from Fig. 3 that there are as many manometers 68 as there are compartments and that each manometer is in communication with a particular compartment. These manometers are suitably mounted on a panel 70' and the latter, in turn, is mounted on brackets carried by air pipe 85.

Before testing a tube in accordance with the present invention the tube is saturated with water, and, for convenience, this may be done by immersing the tube in the water of the tank which is maintained at a level above the top of the tube when the tube is in operative position. When the tube is saturated with water it is clamped between the adapter 16 and end plate 19 as described above. It is to be understood that during the testing of a tube a stream of water constantly enters into the tank 10 through inlet pipe 71 and the water is maintained at the desired level by means of an overflow weir 72. The overflow from weir 72 flows through pipe 70 into drainpipes 49 and 73, and thence to the sewer. A drain pipe 77, which is controlled by valve 75, is provided to drain the contents of the tank when desired.

The air to be passed through the diffuser tube to be tested may be obtained from any suitable source of supply; however, I prefer that it be obtained from an air blower 79, operated by an electric motor 80, which is secured to a shelf on portable table 24, as shown in Fig. 1. In this manner I provide a compact testing apparatus which can be readily moved to the desired place for testing of the tube. The air from the blower passes through air supply pipe 81, controlled by air regulator valve 82, through a heat exchanger 84 which cools the air coming from the blower, through air pipe 85, through a conventional orifice metering device 87 to the air main 51 and from there into the tube, as described above. All of these parts are carried by the portable table. As the air enters the tube, it forces any water in the tube through opening 35 in the end plate 19, through piezometer line 33 and into the drain pipe 48.

As a preliminary to the method of determining the uniformity of distribution of air through the diffuser tube in accordance with the present invention, the discharge characteristics of the tube are determined by the amount of air inflow through the tube and the pressure losses therein by conventional apparatus and in accordance with known methods. Thus, there is provided a mercury manometer A to indicate the pressure in the air supply pipe 85 downstream from the orifice plate 87, a carbon tetrachloride manometer B to indicate the pressure in the diffuser tube being tested, a water manometer C to indicate the pressure differential across the orifice 87 and a carbon tetrachloride manometer D to indicate the pressure in air main 51. These manometers are mounted on a panel E which is also carried by the portable table. The tubes are tested at flows of approximately 2, 4, 6 and 8 cubic feet per minute (C. F. M.), and the pressure losses recorded for each flow.

When blower 79 is started air regulator valve 82 is slowly opened, bleeder valve 89 is then opened and water in the tube assembly and air inlet line 32 is blown out. Bleeder valve 89 is now closed and valve 90 is then opened and end plate assembly 19 is blown out. Valve 90 is then closed and the test continues.

The air input to the tube is first regulated so that manometer C shows a differential equivalent to about 2 C. F. M. The air is allowed to blow for 3 minutes before manometer readings are taken. This 3 minute flowing period is required to establish stable flow conditions. It has been found through experimentation that readings taken immediately after the air is allowed to discharge through a saturated tube indicates an exaggerated head loss. However, after allowing the air to blow through the tube for this 3 minute period and then taking the readings, it has been found that true head losses are indicated.

The differential of each manometer A, B, C and D is then measured and the readings recorded. The air input is increased in steps to 4, 6 and 8 cubic feet per minute and the readings recorded for each operation. The tube pressure loss is calculated by subtracting the head of water in inches, over the centerline of tube, from the differential reading of the tube pressure corrected to inches of water. The pressure loss of the tube adapter 16, and orifice 87, is calculated in the same manner as the tube pressure loss.

The rate of air flow is determined in accordance with usual methods of computation from the orifice differential pressure, the wet and dry bulb temperature, the absolute pressure of the flowing air, and the orifice size and constants.

Differential pressure across orifice 87 is obtained as a direct reading from manometer C. The absolute air pressure in the air supply pipe, required to compute the air flow, is obtained by adding the downstream pressure, in inches of mercury, to the barometric pressure, in inches of mercury. The wet and dry bulb temperatures are obtained from direct readings of thermometers 91 and 92.

Having determined the discharged characteristics of the tube, the uniformity of distribution of air therethrough is determined as follows.

Distribution hood 63 is placed over the tube as shown in Fig. 3. The air blown through the tube, which may be at a known rate of flow, passes through the tube and into the liquid in which tube is submerged. The air passes up through the liquid and into the compartments 64, and from there through the orifices 65. The pressure differentials of the air across each of these orifices are indicated directly on the manometers 68, and thereby the rates of flow, and hence by merely glancing at these manometers to observe the pressure differentials shown, the rates of flow and the distribution of air through each section of the tube is indicated. It is, of course, obvious that the exact rate of flow of air discharged through each section of the tube may be computed by known calculations derived from the pressure readings on the manometers and the known rate of flow through the tube. For ease in observing the levels of the liquid in the manometers, the liquid may be dyed any suitable color.

Upon completion of the test, the tube is removed as described above and the operations are repeated, as desired, on other tubes to be tested.

While my invention has been described in connection with a method for testing the uniformity of distribution of air through diffuser tubes to be used in a sewage treating system, it is, of course, obvious that this same method and apparatus may be applied to the testing of tubes used in other fields such as the chemical field, where aeration, agitation and mixing of liquids and gases are required. The method of my invention may be also carried out with apparatus embodying air measuring devices other than the manometers. Thus, for example, the manometers may be dispensed with and the rates of flow of air through the tube may be measured or indicated directly by means of other pressure responsive, fluid flow measuring devices of the visual indicator type which may be attached directly to the hood, as will be readily understood by those skilled in the art. Or the amounts of air passing through substantially equal sections of the tube in a fixed time may be determined without the aid of measuring devices as by volumetric displacement of a liquid within substantially similar compartments by the air as it passes from each section of the tube into the compartment associated therewith. Other modifications and changes of the apparatus described for carrying out the method of my invention will readily suggest themselves to skilled workers in this art.

My invention is not to be construed as limited to the details of the illustrative embodiment of my invention shown and described above, except as set forth in the appended claims.

I claim:

1. An apparatus for determining the uniformity of distribution of air or other aeriform body being diffused through the wall of a porous diffuser tube, comprising a tank for receiving a liquid, means for removably holding the tube to be tested in a substantially horizontal position within the tank below the level of the liquid, means at one end of the tank for establishing communication between the tube and a source of aeriform body under pressure to be diffused through the wall of the tube, said pressure being greater than the pressure of the atmosphere surrounding the tube, independent means for collecting the diffused aeriform body as it issues from substantially equal sections of the length of the wall of the tube, a plurality of manometers and means establishing communication between each of the collecting means and one of the manometers.

2. An apparatus for determining the uniformity of distribution of air or other aeriform body being diffused through the wall of a porous diffuser tube, comprising a tank for receiving a liquid, means for removably holding the tube to be tested in a substantially horizontal position within the tank below the level of the liquid, means at one end of the tank for establishing communication between the tube and a source of aeriform body under pressure to be diffused through the wall of the tube, said pressure being greater than the pressure of the atmosphere surrounding the tube, a distribution hood adapted to be removably positioned on said tube, said hood being divided into compartments of substantially uniform size and shape for receiving diffused aeriform body issuing from substantially equal sections along the length of the wall of the tube, a plurality of manometers and means establishing communication between each of said compartments and a manometer.

3. An apparatus for determining the uniformity of distribution of air or other aeriform body being diffused through the wall of a porous diffuser tube, comprising a tank for receiving a liquid, means for removably holding the tube to be tested in a substantially horizontal position within the tank below the level of the liquid, means at one end of the tank for establishing communication between the tube and a source of aeriform body under pressure to be diffused through the wall of the tube, said pressure being greater than the pressure of the atmosphere surrounding the tube, a distribution hood adapted to be removably positioned on said tube, said hood being divided into compartments of substantially uniform size and shape for receiving diffused aeriform body issuing from substantially equal sections along the length of the wall of the tube, a plurality of pressure responsive, fluid flow measuring devices of the visual indicator type and means establishing communication between each of said compartments and a measuring device.

4. An apparatus for determining the uniformity of distribution of air or other aeriform body being diffused through the wall of a porous diffuser tube, comprising a tank for receiving a liquid, means for removably holding the tube to be tested in a substantially horizontal position within the tank below the level of the liquid, means at one end of the tank for establishing communication between the tube and a source of aeriform body under pressure to be diffused through the wall of the tube, said pressure being greater than the pressure of the atmosphere surrounding the tube, a distribution hood adapted to be removably positioned on said tube, said hood being divided into compartments of substantially uniform size and shape for receiving diffused aeriform body issuing from substantially equal sections along the length of the wall of the tube, means for venting aeriform body from each of said compartments and thereby establish a pressure differential between the interior of said compartments and the surrounding atmosphere, a plurality of manometers and means establishing communication between each of said compartments and a manometer.

5. An apparatus for determining the uniformity of distribution of air or other aeriform body being diffused through the wall of a porous diffuser tube, comprising a tank for receiving a liquid, means for removably holding the tube to be tested in a substantially horizontal position within the tank below the level of the liquid, means at one end of the tank for establishing communication between the tube and a source of aeriform body under pressure to be diffused through the wall of the tube, said pressure being greater than the pressure of the atmosphere surrounding the tube, a distribution hood having an open bottom and being provided with partitions for dividing the hood into compartments of substantially uniform size and shape, said hood being adapted to be removably positioned with its open end on said tube to divide the length of the tube into substantially equal sections and to receive the diffused aeriform body issuing from the wall of each of said sections in a compartment associated with that section, means for venting aeriform body from each of said compartments and thereby establish a pressure differential between the interior of said compartments and the surrounding atmosphere, a plurality of manometers and means establishing communication between each of said compartments and a manometer.

6. An apparatus for determining the uniformity of distribution of air or other aeriform body being diffused through the wall of a porous diffuser tube, comprising a tank for receiving a liquid, means for removably holding the tube to be tested in a substantially horizontal position within the tank below the level of the liquid, means at one end of the tank for establishing communication between the tube and a source of aeriform body under pressure to be diffused through the wall of the tube, said pressure being greater than the pressure of the atmosphere surrounding the tube, a distribution hood having top, side and end walls and being open at the bottom, vertically disposed partitions extending from said top wall and between said side walls to said open bottom of said hood to divide the hood into compartments of substantially uniform size and shape, the free ends of the end walls and of the partitions at the open bottom of the hood being shaped to conform to the contour of the tube and being adapted to rest on the tube when the hood is removably positioned thereon, thereby dividing the length of the tube into sections of substantially equal size with a compartment of said hood directly above each of said sections to receive diffused aeriform body issuing from the tube, means for venting aeriform body from each of said compartments and thereby establish a pressure differential between the interior of said compartments and the surrounding atmosphere, a plurality of manometers and means establishing communication between each of said compartments and a manometer.

7. An apparatus for determining the uniformity of distribution of air or other aeriform body being diffused through the wall of a porous diffuser tube, comprising a tank for receiving a liquid, means for removably holding the tube to be tested in a substantially horizontal position within the tank below the level of the liquid, means at one end of the tank for establishing communication between the tube and a source of aeriform body under pressure to be diffused through the wall of the tube, said pressure being greater than the pressure of the atmosphere surrounding the tube, independent means for collecting the diffused aeriform body as it issues from substantially equal sections of the length of the wall of the tube, a plurality of fluid flow measuring devices of the visual indicator type and means establishing communication between each of the collecting means and one of the said measuring devices.

8. An apparatus for determining the uniformity of distribution of air or other aeriform body being diffused through the wall of a porous diffuser tube, comprising a tank for receiving a liquid, means for removably holding the tube to be tested in a substantially horizontal position within the tank below the level of the liquid, means at one end of the tank for establishing communication between the tube and a source of aeriform body under pressure to be diffused through the wall of the tube, said pressure being greater than the pressure of the atmosphere surrounding the tube, independent means for collecting the diffused aeriform body as it issues from substantially equal sections of the length of the wall of the tube, each of said collecting means having an opening for venting the aeriform body to the atmosphere, and a plurality of pressure responsive, fluid flow measuring devices, each of said devices being in communication with one of the collecting means for the aeriform body.

PHILIP F. MORGAN.

REFERENCES CITED

The following references are of record in the file of this patent:

UNITED STATES PATENTS

| Number | Name | Date |
|---|---|---|
| 423,083 | Roberts | Mar. 11, 1890 |
| 699,539 | Lewis | May 6, 1902 |
| 1,304,208 | Shakespear | May 20, 1919 |
| 1,306,575 | Brown | June 10, 1919 |
| 1,325,747 | McGrath | Dec. 23, 1919 |
| 1,384,614 | Hall | July 12, 1921 |
| 1,599,964 | Haven | Sept. 14, 1926 |
| 1,985,348 | Henneberger | Dec. 25, 1934 |
| 2,104,047 | Long | Jan. 4, 1938 |
| 2,355,858 | Hahn et al. | Aug. 15, 1944 |

FOREIGN PATENTS

| Number | Country | Date |
|---|---|---|
| 27,741 | Great Britain | 1912 |
| 104,283 | Australia | June 30, 1938 |